United States Patent Office 3,642,948
Patented Feb. 15, 1972

3,642,948
HIGH IMPACT STRENGTH MOLDING MIXTURES BASED ON CHLORINATED POLYVINYLCHLORIDE
Johann Bauer, Georg Hollenbach, Walter Popp, and Alex Sabel, Burghausen, Upper Bavaria, Germany, assignors to Wacker-Chemie GmbH, Munich, Germany
No Drawing. Filed Jan. 10, 1969, Ser. No. 790,433
Claims priority, application Germany, Jan. 12, 1968, P 17 19 330.5
Int. Cl. C08f 29/24, 29/12, 37/18
U.S. Cl. 260—876 R                    3 Claims

ABSTRACT OF THE DISCLOSURE

High impact strength molding mixtures consisting essentially of chlorinated polyvinylchloride having mixed intimately therewith (1) from 5% to 25% by weight of said mixture of a modified butadiene-styrene copolymer selected from the group consisting of acrylonitrile modified butadiene-styrene copolymers and lower alkyl methacrylate modified butadiene-styrene copolymers and (2) from 0.1% to 5.0% by weight of said mixture of low pressure polyethylene having an average molecular weight of between 20,000 and 200,000; as well as high impact strength molded materials produced from said mixture.

THE PRIOR ART

In order to obtain molded materials with an effective impact strength from medium to high impact strength chlorinated polyvinylchloride, particularly chlorinated polyvinylchlorides having a chlorine content of above 62%, it has previously been necessary to introduce, into said chlorinated polyvinylchloride, up to 25% and over, based on the weight of the admixture, of a plasticizing agent capable of plasticizing chlorinated polyvinylchloride. Unfortunately, such high amounts of foreign substances in the molding material have a possibly considerably great influence on the characteristic of the properties of the chlorinated polyvinylchloride. Even with amounts of 20% additional of plasticizing agents, the heat distortion of the plasticized chlorinated polyvinylchloride is decreased in most cases to such an extent that the corresponding molded materials no longer have stability against hot water. Moreover, the introduction of a plasticizing agent in excess of 20% by weight is hardly justifiable economically although the same is required or often necessary in order to obtain the desired high impact strength in molded materials produced from the plasticized chlorinated polyvinylchlorides.

OBJECTS OF THE INVENTION

An object of the present invention is the obtention of molding mixtures based on chlorinated polyvinylchloride having a high impact strength of the molded polymer without substantially effecting its heat distortion.

Another object of the invention is the obtention of high impact strength molding mixtures consisting essentially of chlorinated polyvinylchloride having mixed intimately therewith (1) from 5% to 25% by weight of said mixture of a modified butadiene-styrene copolymer selected from the group consisting of acrylonitrile modified butadiene-styrene copolymers and lower alkyl methacrylate modified butadiene-styrene copolymers and (2) from 0.1% to 5.0% by weight of said mixture of low pressure polyethylene having an average molecular weight of between 20,000 and 200,000.

A further object of the invention is the obtention of high impact strength molded bodies produced from the aforesaid molding mixtures.

These and other objects of the invention will become more apparent as the description thereof proceeds.

DESCRIPTION OF THE INVENTION

It has now been discovered that the above objects can be achieved in the production of high impact strength molding mixtures based on chlorinated polyvinylchloride, possibly with the inclusion of small amounts of other polymers, which molding mixtures are characterized in that they contain from 5% to 25% by weight of butadiene-styrene copolymers which are modified with acrylonitrile or a methacrylic acid ester, as well as low pressure polyethylene with an average molecular weight of between 20,000 to 200,000, in amounts of from 0.1% to 5.0% by weight, preferably from 0.5% to 3.0% by weight, as related to the total mixture.

By means of the addition of low pressure polyethylene and a butadiene-styrene copolymer, where the copolymer is either modified with acrylonitrile or with a methacrylic acid ester, molding materials are obtained with an impact resistance (in a notch-bar test) which is almost doubled with reference to plasticized chlorinated polyvinylchloride mixtures, and consequently may be used, for instance, for the preparation of hot water resistant pipes or fittings or plates for the construction of chemical apparatus.

The good heat distortion properties of the molded bodies based on chlorinated polyvinylchloride are hardly ever influenced unfavorably by modifying the molding mixtures according to the present invention. On the contrary, an improvement often results. This surprising result could not be expected since low pressure polyethylene alone is completely unsuited as an impact strengthening component in chlorinated polyvinylchloride molding mixtures.

The chlorinated polyvinylchloride employed is prepared according to common methods. If desired, admixtures of chlorinated polyvinylchloride types with various degrees of chlorination are suitable as well. Preferably, the chlorinated polyvinylchloride molding material has a chlorine content in excess of 62%.

The butadiene-styrene copolymers modified with acrylonitrile utilizable in the invention are commonly referred to in the trade as an "ABS resin." These materials are ordinarily sold as modifiers for polyvinylchloride. They are not simple terpolymers of the three monomers, but usually are either (1) a mixture of styrene-acrylonitrile copolymer with an acrylonitrile-butadiene rubber or (2) a mixture of a styrene-acrylonitrile copolymer grafted onto polybutadiene. They are thermoplastic resins with a high impact strength, high heat distortion temperature, and are resistant to the action of most solvents, oils, and chemicals. Usable as an acrylonitrile modified butadiene-styrene copolymer is, for example, the product sold under the trade name "Blendex 301."

The butadiene-styrene copolymers modified with methacrylic acid esters such as lower alkyl methacrylates, preferably methyl methacrylate, are likewise utilizable in the invention. These materials have the same properties as the "ABS resins" and are butadiene-styrene copolymers grafted with methacrylic acid esters. Usable as lower alkyl methacrylate modified butadiene-styrene copolymers are, for example, butadiene-styrene copolymers grafted with methyl methacrylate sold under the trade name "Kane Ace B."

The high impact strength molding mixtures of the present invention may be admixed with common stabilizers, either individually or in mixtures, such as poly-basic lead sulfate, lead sulfide phosphite, basic lead carbonate, lead oxide, dibutyltin dilaurate, dibutyltin maleate, alkaline earth silicates, hydroquinone, lead phenolate and aromatic compounds which may contain amine and phenol groups. The molding mixtures may also be compounded, as is customary, with lubricants, for instance, mixtures of saturated higher fatty alcohols, waxes, oils and metal salts of stearic acid. Other preparation agents for compounding, known in the art, may be used as well.

The following examples are illustrative of the practice of the invention without, however, being deemed limitative in any manner.

The parts cited in the examples are always parts by weight.

EXAMPLE 1

Tests 1–21

90 or 80 parts, respectively, of chlorinated polyvinylchloride with a chlorine content of 66.7% and a K-value of 47.1 were admixed with 10 or 20 parts of an acrylonitrile modified butadiene-styrene copolymer, sold under the registered trademark "Blendex 301," together with 4 parts of polybasic lead sulfate, 2 parts of liquid lead stabilizer ("PV 31 Bärlocher") and two parts of lubricant (mixture of saturated higher fatty alcohols). 100 parts of this mixture were admixed with 1.3 or 5 parts of low pressure polyethylene and were worked at 175° C. on a mixing roller mill into a roll sheet. The still warm roll sheets were subsequently compressed at 175° C. and 200 atmospheres within 10 minutes into 4 mm. plates. For the determination of the impact strength according to DIN 53,453 as well as the "Vicat" temperature according to VDE 0302, test bodies were cut from this compressed plate. Table 1 contain the test values of the different mixtures in which the molecular weight of the low pressure polyethylene was either 50,000, 80,000 to 90,000 and 110,000. Tests 1, 2 and 12 serve as comparison tests.

TABLE 1

| Test No. | Chlorinated polyvinyl-chloride, K-value 47.1, Cl 66.7% | "Blendex 301" | Low pressure polyethylene (molecular weight) | | | Impact strength (kp. cm./cm.²) | | | | "Vicat" temperature (° C.) |
|---|---|---|---|---|---|---|---|---|---|---|
| | | | 50,000 | 80–90,000 | 110,000 | 22° C. | 0° C. | −20° C. | −40° C. | |
| 1 | 100 | | | | | <1.9 | | | | 110 |
| 2 | 90 | 10 | | | | 2.2 | 2.2 | <1.9 | | 109 |
| 3 | 90 | 10 | 1 | | | 5.3 | 3.2 | 3.2 | 2.3 | 111 |
| 4 | 90 | 10 | 3 | | | 10.0 | 5.8 | 4.1 | 2.7 | 110 |
| 5 | 90 | 10 | 5 | | | 8.8 | 5.0 | 3.8 | 3.0 | 108 |
| 6 | 90 | 10 | | 1 | | 4.3 | 3.5 | 2.6 | 2.1 | 108 |
| 7 | 90 | 10 | | 3 | | 8.7 | 5.6 | 3.4 | 3.1 | 108 |
| 8 | 90 | 10 | | 5 | | 8.4 | 5.3 | 3.8 | 3.2 | 108 |
| 9 | 90 | 10 | | | 1 | 6.6 | 4.3 | 3.6 | 3.1 | 111 |
| 10 | 90 | 10 | | | 3 | 7.8 | 4.6 | 4.2 | 2.8 | 111 |
| 11 | 90 | 10 | | | 5 | 3.9 | 5.4 | 5.0 | 3.2 | 109 |
| 12 | 80 | 20 | | | | 8.0 | 5.9 | 4.5 | 2.9 | 108 |
| 13 | 80 | 20 | 1 | | | 13.0 | 10.5 | 6.4 | 5.2 | 108 |
| 14 | 80 | 20 | 3 | | | N.b. | 13.0 | 9.5 | 7.3 | 106 |
| 15 | 80 | 20 | 5 | | | 16.5 | 9.3 | 7.2 | 6.2 | 107 |
| 16 | 80 | 20 | | 1 | | 15.0 | 11.5 | 7.2 | 4.8 | 106 |
| 17 | 80 | 20 | | 3 | | N.b. | 11.1 | 8.8 | 5.9 | 106 |
| 18 | 80 | 20 | | 5 | | N.b. | 11.0 | 8.4 | 5.7 | 107 |
| 19 | 80 | 20 | | | 1 | 17.0 | 11.1 | 8.0 | 5.3 | 108 |
| 20 | 80 | 20 | | | 3 | N.b. | | 8.2 | 5.7 | 107 |
| 21 | 80 | 20 | | | 5 | N.b. | 9.8 | 5.3 | 4.1 | 109 |

Note.—N.b.=not broken.

EXAMPLE 2

Tests 22–36

Analogous to tests 2 to 21, however, with the difference that instead of the acrylonitrile modified butadiene-styrene copolymer, a grafted butadiene-styrene copolymer, grafted with methyl methacrylate, which is sold under the registered trademark "Kane Ace B 12," was employed. Otherwise, the preparation was the same as in tests 1–21 of Example 1. The test results are listed in Table 2. Tests 1, 22 and 31 serve as comparison tests.

TABLE 2

| Test No. | Chlorinated polyvinyl chloride, K-value 47.1, Cl 66.7% | "Kane Ace B 12" | Low pressure polyethylene (molecular weight) | | | Impact strength (kp. cm./cm.²) | | | | "Vicat" temperature (° C.) |
|---|---|---|---|---|---|---|---|---|---|---|
| | | | 50,000 | 80–90,000 | 110,000 | 22° C. | 0° C. | −20° C. | −40° C. | |
| 1 | 100 | | | | | 1.9 | | | | 110 |
| 22 | 90 | 10 | | | | 3.6 | 2.2 | <1.9 | <1.9 | 108 |
| 23 | 90 | 10 | 1 | | | 8.0 | 5.8 | 3.5 | 2.7 | 112 |
| 24 | 90 | 10 | 3 | | | 11.4 | 6.1 | 4.2 | 2.8 | 110 |
| 25 | 90 | 10 | 5 | | | 9.5 | 6.0 | 3.5 | 2.9 | 111 |
| 26 | 90 | 10 | | 1 | | 9.6 | 6.8 | 3.8 | 3.2 | 108 |
| 27 | 90 | 10 | | 3 | | 11.1 | 7.7 | 3.5 | 3.1 | 108 |
| 28 | 90 | 10 | | 5 | | 11.4 | 4.3 | 3.0 | 2.8 | 108 |
| 29 | 90 | 10 | | | 3 | 11.4 | 9.0 | 3.9 | 3.5 | 111 |
| 30 | 90 | 10 | | | 5 | 8.0 | 5.6 | 3.8 | 2.7 | 112 |
| 31 | 80 | 20 | | | | 15.0 | 6.8 | 3.4 | 2.2 | 108 |
| 32 | 80 | 20 | 1 | | | 52.0 | 28.5 | 13.2 | 9.3 | 110 |
| 33 | 80 | 20 | 3 | | | 26.5 | 11.9 | 8.0 | 6.0 | 107 |
| 34 | 80 | 20 | 5 | | | 28.5 | 12.7 | 7.8 | 5.4 | 107 |
| 35 | 80 | 20 | | | 3 | 28.0 | 11.4 | 6.9 | 4.8 | 107 |
| 36 | 80 | 20 | | | 5 | 22.0 | 10.9 | 6.4 | 3.5 | 110 |

TABLE 4

| Test No. | Chlorinated polyvinylchloride K-value 47.1, Cl 66.7% | Chlorinated polyvinylchloride K-value 58.5, Cl 65.1% | "Levapren 450" | Low pressure polyethylene, MW =110,000 | Impact strength (kp. cm./cm.²) 22° C. | 0° C. | −20° C. | −40° C. | "Vicat" temperature (° C.) |
|---|---|---|---|---|---|---|---|---|---|
| 1 | 100 | | | | <1.9 | | | | 110 |
| 37 | | 100 | | | <1.9 | | | | 109 |
| 50 | 90 | | 10 | | <1.9 | | | | 89 |
| 51 | 90 | | 10 | 1 | 2.5 | 2.1 | 2.1 | <1.9 | 86 |
| 52 | | 90 | 10 | | 2.2 | 2.1 | 2.1 | 2.0 | 91 |
| 53 | | 90 | 10 | 1 | 3.5 | 2.7 | 2.5 | 2.4 | 91 |
| 54 | 80 | | 20 | | <1.9 | | | | 65 |
| 55 | 80 | | 20 | 1 | 3.2 | 2.7 | 2.5 | 2.6 | 67 |
| 56 | | 80 | 20 | | 2.5 | 1.9 | 2.0 | <1.9 | 65 |
| 57 | | 80 | 20 | 1 | 11.1 | 3.7 | 3.4 | 3.1 | 69 |

EXAMPLE 3

Tests 37–49

Contrary to tests 22–36 of Example 2, a chlorinated polyvinylchloride with a chlorine content of 65.1% and a K-value of 58.5 was employed. The molding mixture recipe was modified as in tests 22–36 of Example 2. Table 3 contains the respective test values. Tests 37, 38 and 44 serve as comparison tests.

TABLE 3

| Test No. | Chlorinated polyvinyl chloride, K-value 58.5, Cl 65.1% | "Kane Ace B 12" | Low pressure polyethylene (molecular weight) 50,000 | 80–90,000 | 110,000 | Impact strength (kp. cm./cm.²) 22° C. | 0° C. | −20° C. | −40° C. | "Vicat" temperature (° C.) |
|---|---|---|---|---|---|---|---|---|---|---|
| 37 | 100 | | | | | <1.9 | | | | 109 |
| 38 | 90 | 10 | | | | 12.7 | 5.5 | 2.8 | 2.1 | 109 |
| 39 | 90 | 10 | 1 | | | 40.0 | 17.5 | 6.8 | 7.4 | 112 |
| 40 | 90 | 10 | 3 | | | 20.5 | 11.7 | 5.9 | 4.9 | 112 |
| 41 | 90 | 10 | 5 | | | 13.6 | 8.0 | 7.0 | 3.7 | 112 |
| 42 | 90 | 10 | | 1 | | 20.0 | 10.2 | 6.8 | 5.3 | 110 |
| 43 | 90 | 10 | | | 3 | 19.9 | 11.1 | 6.7 | 4.8 | 112 |
| 44 | 80 | 20 | | | | 30.0 | 12.9 | 6.3 | 3.7 | 108 |
| 45 | 80 | 20 | 1 | | | 58.0 | 31.0 | 15.0 | 10.0 | 110 |
| 46 | 80 | 20 | 3 | | | 50.0 | 20.4 | 12.4 | 9.8 | 109 |
| 47 | 80 | 20 | 5 | | | 27.0 | 18.5 | 10.2 | 4.5 | 109 |
| 48 | 80 | 20 | | 1 | | 44.5 | 18.5 | 11.3 | 5.9 | 109 |
| 49 | 80 | 20 | | | 3 | 43.0 | 13.8 | 10.6 | 5.9 | 110 |

EXAMPLE 4 (COMPARATIVE TESTS)

Tests 50–57

90 or 80 parts of chlorinated polyvinylchloride with a chlorine content of 66.7% and a K-value of 47.1 or chlorinated polyvinylchloride with a chlorine content of 65.1% and a K-value of 58.5 were admixed with 10 or 20 parts of a vinyl acetate-ethylene copolymer (commercial product "Levapren 450" as well as with 4 parts of polybasic lead sulfate, 2 parts of liquid lead stabilizer and 2 parts of lubricant as in Examples 1, 2 and 3. These molding mixtures were then compared respectively with an admixture which contains an additional 1 part of low pressure polyethylene having an average molecular weight of 110,000. Similarly, as in Example 1, the mixtures were compressed into plates. Table 4 contains the test values of the impact strength and of the "Vicat" temperature.

The low pressure polyethylene content which increases the impact strength occurred only with the 80:20 mixtures; however, with these mixtures a considerable decrease of the "Vicat" temperature occurred. It is evident that the addition of low pressure polyethylene does not necessarily result in the advantage of the present invention, with any plasticizing agent, but rather that these advantages depend on the employment of butadiene-styrene copolymers which are modified with either acrylonitrile or a methacrylic acid ester with a lower alkanol.

The preceding specific embodiments are illustrative of the practice of the invention. It is to be understood, however, that other expedients known to those skilled in the art may be employed without departing from the spirit of the invention.

We claim:

1. High impact strength molding mixtures consisting essentially of chlorinated polyvinylchloride having a chlorine content of at least 62%, having mixed intimately therewith (1) from 5% to 25% by weight of said mixture of a copolymer selected from the group consisting of (a) a mixture of styrene-acrylonitrile copolymer with an acrylonitrile-butadiene rubber, (b) a styrene-acrylonitrile copolymer grafted onto polybutadiene and (c) a lower alkyl methacrylate grafted onto a butadiene-styrene copolymer and (2) from 0.1% to 5% by weight of said mixture of low pressure polyethylene having an average molecular weight of between 20,000 and 200,000.

2. The high impact strength molding mixtures of claim 1 wherein said low pressure polyethylene is present in an amount of from 0.5% to 3% by weight of said mixture.

3. Molded bodies having a high impact strength and good temperature stability produced by molding the high impact strength molding mixtures of claim 1.

References Cited

UNITED STATES PATENTS 3,299,182  1/1967  Jennings et al. _____ 260—897 C

FOREIGN PATENTS 722,769  11/1965  Canada _____ 260—876
725,251  1/1966  Canada _____ 260—897
1,127,340  9/1968  Great Britain _____ 260—876

MURRAY TILLMAN, Primary Examiner

H. ROBERTS, Assistant Examiner

U.S. Cl. X.R.

260—889, 897 C